US006221950B1

(12) United States Patent
Heinrich et al.

(10) Patent No.: US 6,221,950 B1
(45) Date of Patent: Apr. 24, 2001

(54) UNVULCANIZED RUBBER MIXTURE

(75) Inventors: Gert Heinrich; Carla Recker, both of Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/102,754

(22) Filed: Jun. 23, 1998

(30) Foreign Application Priority Data

Jun. 24, 1997 (DE) .............................................. 197 26 729

(51) Int. Cl.[7] ....................................................... C08K 3/00
(52) U.S. Cl. .......................... 524/492; 524/493; 524/495; 524/496; 523/212; 523/213; 523/214; 523/215; 523/216; 523/217
(58) Field of Search ..................................... 524/492, 493, 524/495, 496; 523/212, 213, 214, 215, 216, 217

(56) References Cited

U.S. PATENT DOCUMENTS

| 3,994,742 | * | 11/1976 | Russel et al. ......................... 106/288 |
| 5,409,969 | * | 4/1995 | Hamada ................................ 523/213 |
| 5,486,560 | | 1/1996 | Shiga et al. ............................ 524/401 |

FOREIGN PATENT DOCUMENTS

| 0405216 | 1/1991 | (EP) . |
| 0575851 | 12/1993 | (EP) . |

OTHER PUBLICATIONS

Hoffman, "Intelligent'Polymers in Medicine and Biotechnology", *Macromol. Symp.*, 98, pp. 645–664 (1995).

Ghandi et al., *Smart Materials and Structures*, pp. 36–69 and 137–151 (1992).

Kagami et al., "Shape Memory Behaviors of Crosslinked Copolymers Containing Stearyl Acrylate", *Macromol. Chem., Rapid Commun.*, 17, pp. 539–543 (1996).

Wang et al., "Carbon–Silica Dual Phase Filler, a New Generation Reinforcing Agent for Rubber, Part II. Application of Carbon–Silica Dual Phase Filler To Tire Tread Compounds", Paper No. 25, Rubber Division American Chemical Society, Anaheim, California (May 6–9 1997).

Nagasaki et al., "An Intelligent Polymer Brush", *Trends in Polym. Sci.*, 4, pp. 59–64 (1996).

Derwent Abstract No. 96–017210 of JP. No. 07–291981, published Nov. 7, 1995.

* cited by examiner

*Primary Examiner*—Edward J. Cain
(74) *Attorney, Agent, or Firm*—Greenblum & Bernstein P.L.C.

(57) ABSTRACT

Unvulcanized rubber mixture includes at least one rubber, aggregate, and at least one filler, wherein a surface of the at least one filler has been modified with a stimuli-sensitive substance. A filler for unvulcanized rubber mixtures includes a surface which has been modified with a stimuli-sensitive substance. A process for making an unvulcanized rubber mixture including at least one rubber, aggregate, and at least one filler, wherein a surface of the at least one filler has been modified with a stimuli-sensitive substance. The process includes coating a surface of at least one filler with a stimuli-sensitive substance to form at least one coated filler, and mixing the at least one coated filler with unvulcanized rubber and aggregate. A rubber product formed from an unvulcanized rubber mixture includes at least one rubber, aggregate, and at least one filler, wherein a surface of the at least one filler has been modified with a stimuli-sensitive substance. Vulcanized rubber including a rubber matrix comprising aggregate and at least one rubber, and at least one filler, wherein a surface of the at least one filler has been modified so as to form a stimuli-sensitive rubber mixture with the rubber matrix surrounding the at least one filler. A process for making vulcanized rubber including a rubber matrix which includes aggregate and at least one rubber, and at least one filler, wherein a surface of the at least one filler has been modified so as to form a stimuli-sensitive rubber mixture with the rubber matrix surrounding the at least one filler. The process includes coating a surface of at least one filler with unvulcanized rubber to form at least one coated filler, mixing the at least one coated filler with unvulcanized rubber and aggregate to form an unvulcanized rubber mixture, and vulcanizing the unvulcanized rubber mixture.

64 Claims, 2 Drawing Sheets

UNVULCANIZED RUBBER MIXTURE

CROSS-REFERENCE TO RELATED APPLICATION

The present invention claims the priority under 35 U.S.C. § 119 of German Patent Application No. 197 26 729.7 filed Jun. 24, 1997, the disclosure of which is expressly incorporated by reference herein in its entirety.

BACKGROUND OF THE INVENTION

1. Field of the Invention

This invention relates to an unvulcanized rubber mixture, which contains an unvulcanized rubber, aggregate, and at least one filler.

2. Discussion of Background

In an unvulcanized rubber mixture, the fillers have significant importance. Not only do they contribute to the cost reduction of unvulcanized rubber mixtures, but their specific effects upon the unvulcanized rubber are utilized. In the field of unvulcanized rubber, one differentiates the fillers according to the distinctiveness of their effect (activity). The activity of a filler is dependent upon its particle size, its specific surface, its geometric shape, and its chemical composition. Thus, one characterizes fillers as active (reinforcing fillers), in which a characteristic optimum is noted in relation to its concentration, such that this unvulcanized rubber feature is "actively" influenced. For example, carbon black and silicic acid are included among these fillers. In contrast to the reinforcing fillers, an almost exclusively constant alteration of the feature image can be observed in the inactive fillers (reinforcing only via volume content), with the degree of the filler. For example, chalk may be used as an inactive filler in unvulcanized rubber mixtures.

As already mentioned, the activity of a filler is dependent upon the particle size, the specific surface, the geometric form of the particle, and its chemical structure. The reinforcing effect is essentially based upon physical and/or chemical reciprocal actions at the border between the filler and the unvulcanized rubber matrix. The surface characteristics of the fillers especially play a significant role. It is, for example, known to modify the surface of silicic acid with a hydrosilicon, in order to produce a good bond to the unvulcanized rubber matrix and thus to influence positively the characteristics of the vulcanized material. Such measures are known, for example, for the production of treads for vehicle pneumatic tires, which give the vehicle pneumatic tires a low rolling friction and a good wet skidding performance. However, such interactions between filler and unvulcanized rubber matrix are based upon a one-time, irreversible coupling process during the manufacture of the vulcanized material. If, however, the atmospheric temperature or the load condition of the vulcanized material changes, for example, a filler which is bound in the conventional way to the matrix is no longer in a position to react to these influences, in order to ensure sufficient dynamic-mechanical characteristics, for example, when the vulcanized material is being used.

SUMMARY OF THE INVENTION

The present invention involves manufacturing an optimal bond, at least between filler and unvulcanized rubber matrix, such that it is possible to adapt the characteristics of the vulcanized material to conditions, e.g., changing atmospheric conditions.

This task is solved in accordance with the invention because the filler surface is modified with a substance which exhibits stimuli-sensitive characteristics.

In accordance with one aspect, the present invention is directed to an unvulcanized rubber mixture, comprising at least one rubber, aggregate, and at least one filler, wherein a surface of the at least one filler has been modified with a stimuli-sensitive substance.

In accordance with another aspect, the at least one rubber comprises natural rubber.

In accordance with yet another aspect, the stimuli-sensitive substance is heterotelechelous. The stimuli-sensitive substance may comprise polysilamine. The polysilamine may have the following structure:

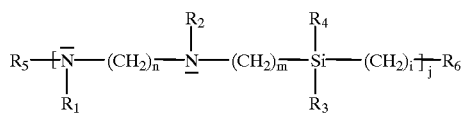

wherein:
1) $R_1, R_2, R_3, R_4, R_5$, and $R_6$ are selected from the group consisting of: —H, -Alkyl (branched or unbranched), -Alkenyl (branched or unbranched), -Acyl, -Silyl, —$NH_2$, —SH, —OH, —COOH, —COH, —NOH, —CN, and —NC;
2) $R_5 \neq R_6$;
3) n, m, and i have values of about 0 to 5; and
4) j>2.

In particular, the above-noted polysilamine may involve the following structure:

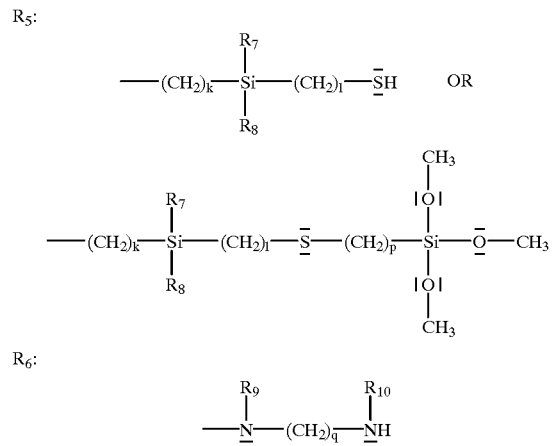

wherein:
1) $R_7, R_8, R_9$, and $R_{10}$ are selected from the group consisting of: —H, -Alkyl (branched or unbranched), -Alkenyl (branched or unbranched), -Acyl, -Silyl, —$NH_2$, —SH, —OH, —COOH, —COH, —NOH, —CN, and —NC; and
2) k, l, p, and q have values of about 0 to 5.

In accordance with another aspect, the at least one filler comprises an active filler, wherein a surface of the active filler is modified with the stimuli-sensitive substance. The active filler may comprise at least one member selected from the group consisting of carbon black, silicic acid, carbon black modified by silicic acid, and polymer microgel.

In accordance with yet another aspect, the at least one filler comprises an inactive filler, wherein a surface of the inactive filler is modified with the stimuli-sensitive substance.

In accordance with still another aspect, the at least one natural rubber comprises at least one member selected from the group consisting of natural rubber, styrene-butadiene-copolymer, acrylonitrile-butadiene-copolymer, isoprene-butadiene-copolymer, polybutadiene, synthetic polyisoprene, isoprene-isobutylene-copolymer, and ethylene-propylene-diene-terpolymer.

In accordance with another aspect, the present invention is directed to a filler for unvulcanized rubber mixtures, wherein a surface of the filler is modified with a stimuli-sensitive substance.

In accordance with another aspect, the present invention is directed to a process for making an unvulcanized rubber mixture comprising at least one rubber, aggregate, and at least one filler, wherein a surface of the at least one filler has been modified with a stimuli-sensitive substance, the process comprising coating a surface of at least one filler with a stimuli-sensitive substance to form at least one coated filler, and mixing the at least one coated filler with unvulcanized rubber and aggregate.

In accordance with another aspect, the present invention is directed to a rubber product formed from an unvulcanized rubber mixture, comprising at least one rubber, aggregate, and at least one filler, wherein a surface of the at least one filler has been modified with a stimuli-sensitive substance.

In accordance with another aspect, the present invention is directed to vulcanized rubber, comprising a rubber matrix comprising aggregate and at least one rubber, and at least one filler, wherein a surface of the at least one filler has been modified so as to form a stimuli-sensitive rubber mixture with the rubber matrix surrounding the at least one filler.

In accordance with another aspect, the at least one rubber comprises at least a first rubber and a second rubber, wherein the surface of the at least one filler is modified such that a stimuli-sensitive rubber mixture forms between the first rubber which is located on the filler surface and the second rubber.

In accordance with yet another aspect, the at least one rubber is selected from the group consisting of natural rubber, styrene-butadiene-copolymer, acrylonitrile-butadiene-copolymer, isoprene-butadiene-copolymer, polybutadiene, synthetic polyisoprene, isoprene-isobutylene-copolymer, and ethylene-propylene-diene-terpolymer. In particular, the at least one rubber may comprise at least polyisoprene and polybutadiene.

In accordance with another aspect, the present invention is directed to a process for making vulcanized rubber comprising a rubber matrix comprising aggregate and at least one rubber, and at least one filler, wherein a surface of the at least one filler has been modified so as to form a stimuli-sensitive rubber mixture with the rubber matrix surrounding the at least one filler, the process comprising coating a surface of at least one filler with unvulcanized rubber to form at least one coated filler, mixing the at least one coated filler with unvulcanized rubber and aggregate to form an unvulcanized rubber mixture, and vulcanizing the unvulcanized rubber mixture.

BRIEF DESCRIPTION OF THE DRAWINGS

The present invention is further described in the detailed description which follows, in reference to the noted plurality of non-limiting drawings, and wherein.

DETAILED DESCRIPTION OF THE INVENTION

Figure 1:
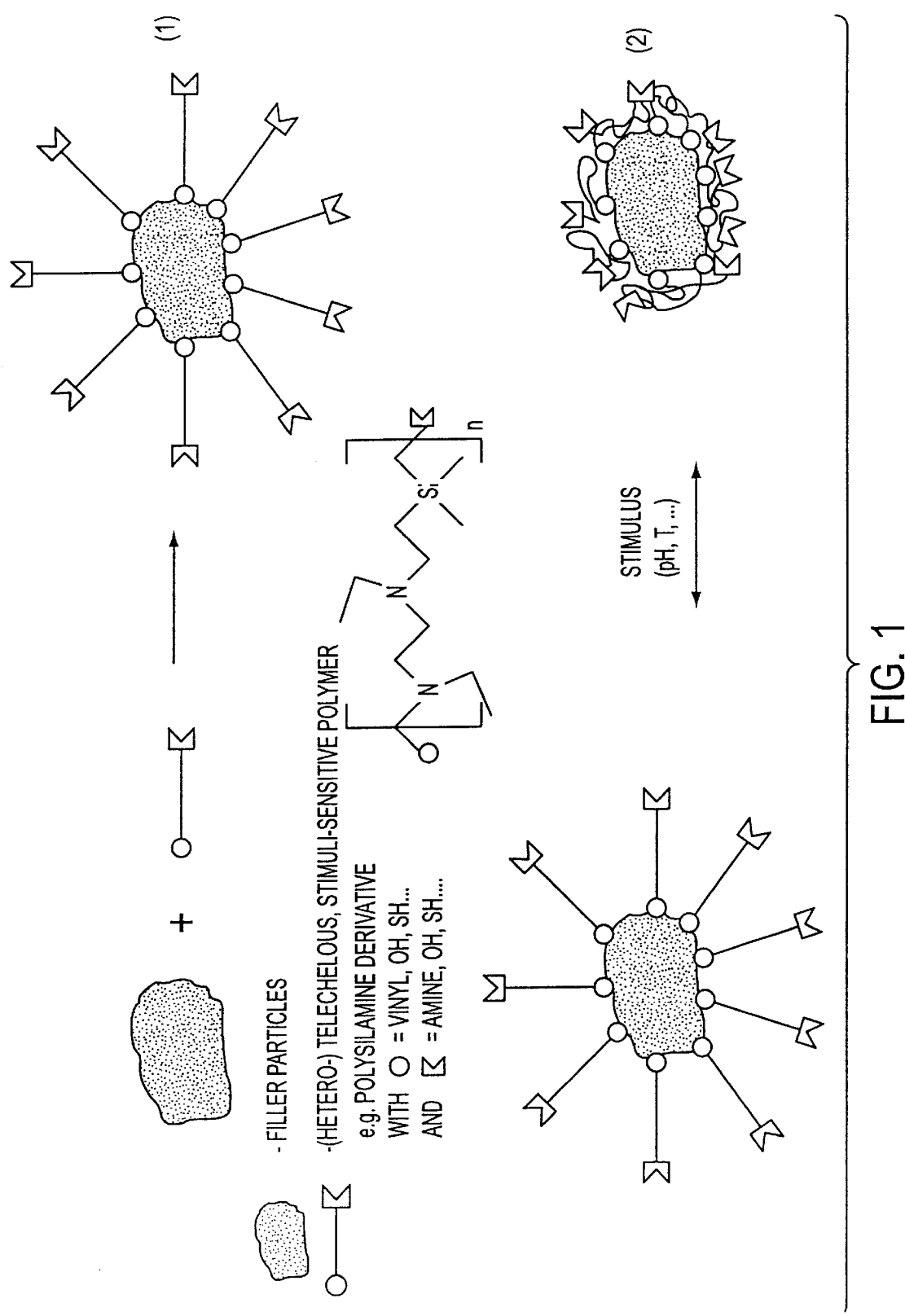
FIG. 1 is a schematic of the coupling of a heterotelechelous, stimuli-sensitive polymer at the filler surface.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description taken with the drawings making apparent to those skilled in the art how the several forms of the invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component, includes the compound or component by itself, as well as in combination with other compounds or components, such as mixtures of compounds.

The present invention involves manufacturing an optimal bond, at least between filler and unvulcanized rubber matrix, such that it is possible to adapt the characteristics of the vulcanized material to conditions, e.g., changing atmospheric conditions.

The term "stimuli-sensitive" is to be understood in accordance with the invention as the ability of a system (substance) to adapt itself (sensitive) to a changeable parameter (stimuli) surrounding this system by a dynamic alteration of one or more characteristics. Such changeable parameters can, for example, be the temperature, the pH, the dynamic stress, or even a magnetic or electric field effect. Stimuli-sensitive substances are known and are for example described in:

Hoffman A. S., *Macromol Symp.*, 98, pp. 645–64 (1995), the disclosure of which is herein incorporated by reference in its entirety;

Ghandi, M. V. & Thompson, B. S., *Smart Materials and Structures* (1st ed.), London: Chapman & Hall (1992), the disclosure of which is herein incorporated by reference in its entirety; and Kagami Y., Gong, J. P., & Osada Y., *Macromol Chem., Rapid Commun.*, 17, pp. 539–43 (1996), the disclosure of which is herein incorporated by reference in its entirety.

Substances based on thiophenes or pyrroles, which can be blended in elastomer and which then effect an alteration in characteristics in the elastomer due to a changed electric field, are also known from U.S. Pat. No. 5,486,560 to SHIGA et al., the disclosure of which is herein incorporated by reference in its entirety. After termination of the stimuli (electric field), the output characteristics of the elastomers are again attained.

In accordance with the invention, however, it could be ascertained that through a simple blending of the stimuli-sensitive substance into an unvulcanized rubber system, which comprises the unvulcanized rubber constituents and aggregates, such as fillers, crosslinking agents, softeners, or anti-oxidant agents, a proportionally large amount of stimuli-sensitive compounds must be blended, in order to attain a targeted influence of certain characteristics of the elastomer through a changeable parameter surrounding them. The amount of filler whose surface exhibits stimuli-sensitive characteristics amounts to preferably 5 to 100 wt % and even more preferably 20 to 100 wt %, based on the total amount of filler used.

In accordance with the invention, through the embedding of at least one filler, the surface of which is modified with such a stimuli-sensitive substance as disclosed in the cited literature, it is possible through targeted interactions between filler-polymer or filler-filler to attain defined, reversible rubber characteristics, which are brought about by the application of an exterior parameter. Through the bonding of such modified fillers in an unvulcanized rubber matrix, a rubber product is attained with vulcanization, which during the change of the atmospheric conditions, is able to adapt its rubber and/or elasticoviscous characteristics thereto, for example. Through this adaptability of the rubber product to certain exterior conditions, the application spectrum of the rubber product can be expanded, e.g., over a large temperature and frequency interval.

In the manufacture of the unvulcanized rubber mixture in accordance with the invention, the filler surfaces are modified by a coating of the stimuli-sensitive substance, and thereafter, these modified fillers are mixed with other, conventional aggregates and unvulcanized rubber constituents. Thereby, it is possible to add the modified filler alone to the unvulcanized rubber constituents or in combination with other typical aggregates (aside from crosslinking chemicals) and to mix them according to a conventional temperature control in a mixing aggregate (e.g., interior mixer). After the completion of such a masterbatch and optionally after storage of the masterbatch, the remaining aggregates, the crosslinking elements (e.g., vulcanization accelerators, sulfur), can be added. It is also not essential to alter significantly the conventional mixing process for manufacturing an unvulcanized rubber mixture.

Substances which are known in the field of unvulcanized rubber, such as carbon black and/or silicic acid and/or polymer microgel, are used as fillers. The carbon blacks should exhibit the following characteristics: DPB value (ASTM D 2414) 90–200 cm$^3$/100 g and a CTAB value (ASTM D 3765) of 80–170 m$^2$/g. The silicic acids should exhibit the following characteristics: bonds with a BET surface of 145–270 m$^2$/g (ASTM D 5604), a CTAB value of 120–285 m$^2$/g (ASTM D 3765), and a pore volume of 0.7–1.7 ml/g (DIN 66133). In addition, carbon blacks modified by silicic acids can be used, as they are mentioned in M. J. Wang, W. J. Patterson, T. A. Brown: "Carbon-Silica Dual Phase Filler, A New Generation Reinforcing Agent for Rubber," Paper No. 25, Rubber Division American Chemical Society, Anaheim, Calif., May 6–9, 1997, the disclosure of which is herein incorporated by reference in its entirety. In polymer microgels, for example, polybutadiene gel can be involved, which is described in EP 0 575 851 B1, the disclosure of which is herein incorporated by reference in its entirety, for example. In addition, for example, polychloroprene gels, (e.g., EP 0 405 216 B1, the disclosure of which is herein incorporated by reference in its entirety), styrene-butadiene-copolymer gels, or even polymethacrylate gels are known. These named fillers count as active fillers, which, as previously noted, optimally influence the characteristics of the unvulcanized rubber in relation to their filling ratio in a particular range. Through the modification of the surfaces of the active fillers by a stimuli-sensitive substance, it is possible to dynamically alter the interaction between filler and polymer (also between filler-filler) exactly when the parameter is applied or when a certain limit is surpassed. Thus, rubber products which react to dynamically high stress, such as tire treads, are made available. It is also possible, however, to equip statically strained rubber products with modified, inactive fillers, for example. Even a combination of modified active and modified inactive fillers, as well as the possibility that only one type of filler is modified, are feasible for certain rubber mixtures.

For the production of the unvulcanized rubber mixture in accordance with the invention, typical aggregates can be used, such as softeners (e.g., mineral oils, fatty acids, and fatty oils), vulcanization accelerators (e.g., thiazol accelerators, guanidine accelerators, thiuram accelerators, and dithyiocarbamate accelerator), crosslinking mediums, or antioxidants (e.g., 6 PPD (N-phenyl-N'-(1,3-dimethylbutyl)-p-phenylenediamine) and DTPD (N,N'-ditoluyl-p-phenylenediamine). It is thereby insignificant which crosslinking chemicals (e.g., sulfur and peroxides such as dicumylperoxide) are used. Elastomers can be used as unvulcanized rubber constituents, such as natural rubber, styrene-butadiene-copolymer, acrylonitrile-butadiene-copolymer, isoprene-butadiene-copolymer, polybutadiene, synthetic polyisoprene, isoprene-isobutylene-copolymer, ethylene-propylene-diene-terpolymer, and mixtures thereof. Examples of preferred dienes of the ethylene-propylene-diene-terpolymer include cyclopentadiene, ethylidenenorbornene, and hexadiene-1,4.

The interaction between filler surface and the elastomer matrix can advantageously be influenced by a stimuli-sensitive substance, which exhibits heterotelechelous characteristics. The stimuli-sensitive phase behavior between the filler surface and the elastomer matrix is attained by the application of a substance which exhibits a chain-like structure, the ends of which are differently chemically modified (heterotelechelous) such as polysilamines (see Nagasaki Y., Kataoka K., *Trends in Polym. Sci.*, 4, pp. 59–64 (1996), the disclosure of which is herein incorporated by reference in its entirety). Heterotelechelous polysilamines are able to adjust themselves as a result of a change of the pH value and/or the temperature and, thus, can influence the interaction between filler and polymer. Thus, polysilamines are preferably used, since in particular the temperature in rubber products subject to dynamic stress has a considerable effect upon the rubber elastic characteristics of the product. A polysilamine with the following structure is a preferred:

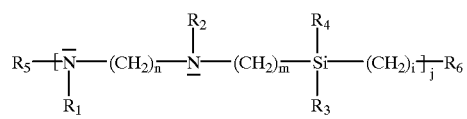

wherein:

1) $R_1$, $R_2$, $R_3$, $R_4$, $R_5$, and $R_6$ are selected from: —H, -Alkyl (branched or unbranched), -Alkenyl (branched or unbranched), -Acyl, -Silyl, —NH$_2$, —SH, —OH, —COOH, —COH, —NOH, —CN, and —NC;

2) $R_5 \neq R_6$;

3) n, m, and i have values of about 0 to 5; and 4) j>2.

The alkyl or alkenyl groups have carbon chains (branched or unbranched) with about 1 to 12, preferably about 1 to 6, carbon atoms, wherein the alkenyl groups have at least one double bond. The alkyl and alkenyl groups may have a cyclic structure, such that aromatic systems fall under the term "alkenyl". These aromatic systems may have substituents, such as —NH$_2$, —NO$_2$, —OCH$_3$, —SH, —OH, —COOH, —COH, -Alkyl (as defined above), or also unsaturated substituents (e.g., vinyl).

The variables n, m, and i have a value of about 0 to 5, preferably about 2 to 4. Since the term "polymer" is determined by the magnitude of j, j should, in accordance with the application, be at least 2 and be able to take on a greater value than is generally common. Thus, values for j through $10^{10}$ and even greater, are known.

The heterotelechelous, stimuli-sensitive substance involving the following structure is a particular embodiment:

$R_5$:

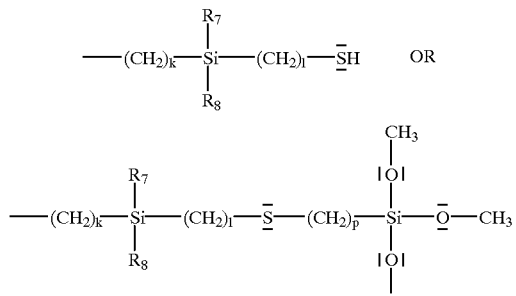

$R_6$:

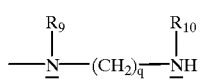

wherein:
1) $R_7$, $R_8$, $R_9$, and $R_{10}$ are selected from: —H, -Alkyl (branched or unbranched), -Alkenyl (branched or unbranched), -Acyl, -Silyl, —$NH_2$, —SH, —OH, —COOH, —COH, —NOH, —CN, —NC; and
2) k, l, p, and q have values of about 0 to 5.

The alkyl and alkenyl groups have carbon chains (branched or unbranched) with about 1 to 12, preferably about 1 to 6, carbon atoms, wherein the alkenyl groups have at least one double bond. The alkyl and alkenyl groups may have a cyclical structure such that aromatic systems fall under the term "alkenyl". These aromatic systems may have substituents, such as —$NH_2$, —$NO_2$, —$OCH_3$, —SH, —OH, —COOH, —COH, -Alkyl (as defined above), or also unsaturated substituents (e.g., vinyl). The variables k, l, p, and q have values of about 0 to 5, preferably about 2 to 4.

It is not only possible, however, to equip the filler surface with a stimuli-sensitive substance; rather, the surface of the filler can also be modified so that it forms a stimuli-sensitive rubber mixture with the rubber matrix directly surrounding it, at least in a vulcanized state. It is thereby possible to modify the filler surface with substances which, due to their characteristics, are able to dynamically influence the interaction between filler and rubber matrix with a changing parameter.

A possibility to modify the surface of the filler, such that it exhibits stimuli-sensitive characteristics with the rubber matrix surrounding it, is present in that in the production of the rubber mixture. At least two unvulcanized rubbers are used, whereby the surface of the filler is modified with a first unvulcanized rubber, so that—at least in the vulcanized state—a stimuli-sensitive mixture of unvulcanized rubber forms between this first unvulcanized rubber present on the filler surface and the adjacent, second unvulcanized rubber of the rubber matrix. This embodiment has the advantage that a selection of stimuli-sensitive unvulcanized rubber mixtures can be done without, since the unvulcanized rubber constituents for producing the rubber product are already present anyway. It is thereby possible that the rubber matrix is produced from a mixture of different unvulcanized rubber constituents, wherein at least one of those enters a stimuli-sensitive relationship with the vulcanized natural rubber constituents located on the filler.

The manufacture of such a modified filler particle can occur in such a way that the filler surface is combined with an unvulcanized rubber and subsequent to this, the modified filler is mixed with other unvulcanized rubber constituents and other typical aggregates. The addition of the individual materials can, as mentioned above, occur in different sequences so that even this mixing process occurs by a conventional method. After the assembly of the corresponding untreated part, it is vulcanized.

It is possible, furthermore, to modify both active fillers characteristics, such as carbon black and/or silicic acid and/or carbon blacks modified by silicic acid and/or polymer microgels, as well as inactive fillers, so as to form a stimuli-sensitive rubber mixture with the rubber matrix directly surrounding the filler. Several filler types (active and/or inactive) can be located in a rubber mixture thereby, with at least one being modified.

To manufacture the unvulcanized rubber mixture in accordance with the invention, typical aggregates, such as softeners, vulcanization accelerators, crosslinking mediums, or antioxidants, can be used. It is thereby inconsequential which crosslinking mediums (e.g., sulphur or peroxide) are used. Elastomers can be used as unvulcanized rubber constituents, such as natural rubber, styrene-butadiene-copolymer, acrylonitrile-butadiene-copolymer, isoprene-butadiene-copolymer, polybutadiene, synthetic polyisoprene, isoprene-isobutylene-copolymer, ethylene-propylene-diene-terpolymer, and mixtures thereof.

It is preferred that the rubber matrix contains at least polyisoprene and that the filler surface has been modified with polybutadiene. The interactions between the polybutadiene, which is coated on the filler, and the polyisoprene, which is located in the rubber matrix, are influenced by temperature increases in such a way that a demixing occurs at the border surface between the polybutadiene and the polyisoprene. This dynamic phase separation affects the characteristics of the rubber material, such as the elasticity of the rubber material, because a sufficient bond of the filler to the rubber matrix is no longer present. It is naturally also possible that the filler surface is coated with polyisoprene and that the rubber matrix surrounding the filler contains at least polybutadiene.

By producing stimuli-sensitive phases between the filler and polymer or filler and filler in a rubber matrix, it becomes possible to optimize the characteristics of the rubber, such that the rubber may have defined characteristics under selected operating conditions (e.g., temperature, load condition, etc.). By bonding the filler to the polymer matrix via stimuli-sensitive phase behavior or substances, it is possible to influence the effect of the filler in a targeted manner. In accordance with the invention, rubber products are produced, which, for example, can be used for the manufacture of vehicle tires (e.g., tire treads). Precisely in this area, where the temperature dependence or the dynamic load-bearing capacity of the product is decisive for the durability of the product, the invention becomes particularly useful. In general, however, other technical rubber products can be modified in accordance with the invention, such as seals, pneumatic springs, or even tubes.

The invention is to be explained in more detail using an embodiment illustrated in the Figures.

Part (1) of FIG. 1 shows a filler particle surface (e.g., carbon black) covered with a polysilamine derivative in such a way that as great a portion of the surface as possible is modified. The filler particles can, for example, be brought into contact with the polysilamine derivative in an agitated vessel. Such a modified filler is mixed into an unvulcanized rubber mixture (not depicted) in a conventional way and is subjected to a conventional mixing process. After the formation of the corresponding unfinished part, such as untreated material for rubber treads, this can be used to manufacture a vehicle pneumatic tire in the assembly. After vulcanizing under conventional conditions, a pneumatic vehicle tire is formed. Referring to part (2) of FIG. 1, the treads of this tire react to changes in temperature or pH, such that by affecting the polysilamine the interaction between the rubber matrix-filler and/or filler-filler is influenced to change the glass transition temperature of the polymer matrix. As a result of changing the glass transition temperature, the elasticoviscous characteristics of the rubber product are changed.

Figure 2:
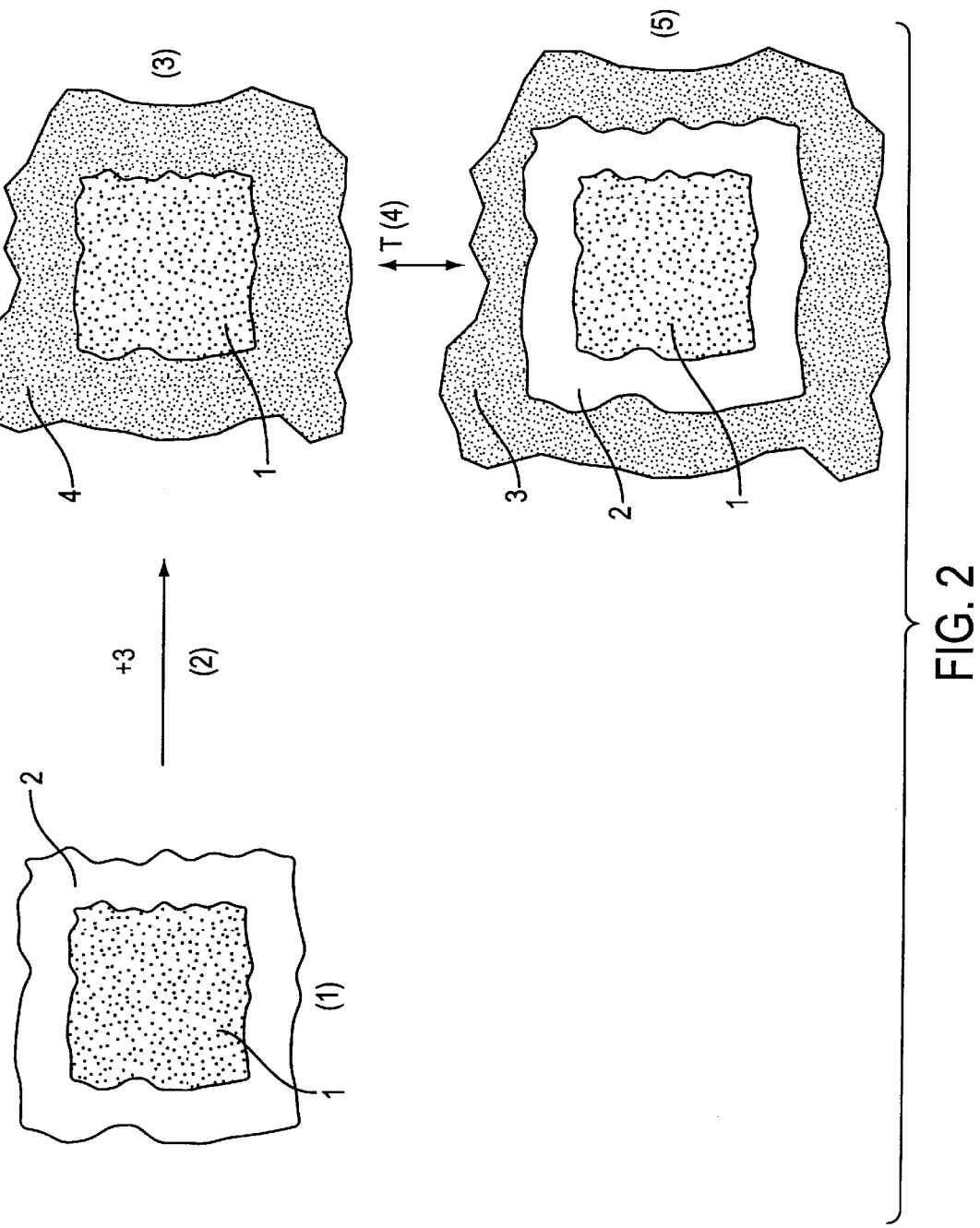
FIG. 2 is a schematic of the bond between a filler and a rubber matrix, such that the filler forms a stimuli-sensitive rubber mixture with the rubber matrix directly surrounding the filler.

Part (1) of FIG. 2 shows the surface of the filler 1 (e.g., carbon black) in combination with a polyisoprene-rubber (IR) 2. The blending of this modified filler involves a conventional method. Referring to part (2) of FIG. 2, the unvulcanized rubber mixture contains at least polybutadiene (BR) 3 as a constituent but this advantageous method also exhibits natural rubber (NR) and/or styrene-butadiene-copolymer (SBR) since, for example, in particular such blends have proven themselves advantageous in the manufacture of treads for vehicle tires. The mixing procedure again occurs according to a conventional method and the unfinished rubber product material, such as unfinished material for tire tread, is used to manufacture vehicle pneumatic tires. After vulcanizing the tire, a vehicle pneumatic tire is formed which exhibits a tread which can adapt its characteristics to different conditions, (e.g., temperature), which vary due to the atmosphere or even also the load-bearing capacity. Referring to part (3) of FIG. 2, the polyisoprene 2, which covers the filler surface, forms a homogenous phase 4 with the polybutadiene 3, which is located in the rubber matrix. Referring to part (5) of FIG. 2, with a temperature increase, a demixing appears in the polyisoprene phase 2 and in the polybutadiene phase 3, such that the interactions between the filler and the rubber matrix are dynamically altered. This demixing creates in the rubber product a decrease of the elasticity of the rubber. Referring to part (4) of FIG. 2, these mixing/demixing processes are reversible in relation to the temperature.

While the invention has been described in connection with certain preferred embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. Unvulcanized rubber mixture, comprising:
   at least one rubber;
   aggregate; and
   at least one filler, wherein a surface of the at least one filler has been modified with a stimuli-sensitive substance; and
   wherein the stimuli-sensitive substance attains reversible rubber characteristics through at least one exterior parameter by interaction between the at least one filler and the at least one rubber and/or filler-filler interactions of the at least one filler.

2. The unvulcanized rubber mixture of claim 1, wherein the at least one rubber comprises natural rubber.

3. The unvulcanized rubber mixture of claim 1, wherein the stimuli-sensitive substance is heterotelechelous.

4. The unvulcanized rubber mixture of claim 3, wherein the stimuli-sensitive substance comprises polysilamine.

5. The unvulcanized rubber mixture of claim 4, wherein the polysilamine has the following structure:

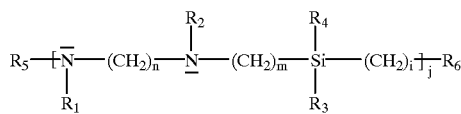

wherein:
1) $R_1$, $R_2$, $R_3$, $R_4$, $R_5$, and $R_6$ are selected from the group consisting of: —H, -Alkyl (branched or unbranched), -Alkenyl (branched or unbranched), -Acyl, -Silyl, —$NH_2$, —SH, —OH, —COOH, —COH, —NOH, —CN, and —NC;
2) $R_5 \neq R_6$;
3) n, m, and i have values of about 0 to 5; and
4) j>2.

6. The unvulcanized rubber mixture of claim 5, wherein:

$R_5$:

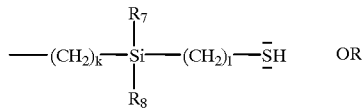

$R_6$:

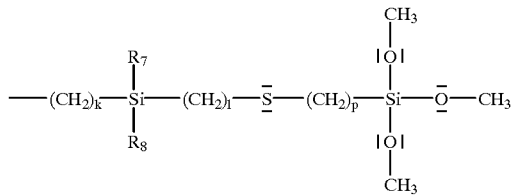

wherein:
1) $R_7$, $R_8$, $R_9$, and $R_{10}$ are selected from the group consisting of: —H, -Alkyl (branched or unbranched), -Alkenyl (branched or unbranched), -Acyl, -Silyl, —$NH_2$, —SH, —OH, —COOH, —COH, —NOH, —CN, and —NC; and
2) k, l, p, and q have values of about 0 to 5.

7. The unvulcanized rubber mixture of claim 1, wherein the at least one filler comprises an active filler, and wherein a surface of the active filler is modified with the stimuli-sensitive substance.

8. The unvulcanized rubber mixture of claim 7, wherein the active filler comprises at least one member selected from the group consisting of carbon black, silicic acid, carbon black modified by silicic acid, and polymer microgel.

9. The unvulcanized rubber mixture of claim 1, wherein the at least one filler comprises an inactive filler, and wherein a surface of the inactive filler is modified with the stimuli-sensitive substance.

10. The unvulcanized rubber mixture of claim 1, wherein the at least one natural rubber comprises at least one member selected from the group consisting of natural rubber, styrene-butadiene-copolymer, acrylonitrile-butadiene-copolymer, isoprene-butadiene-copolymer, polybutadiene, synthetic polyisoprene, isoprene-isobutylene-copolymer, and ethylene-propylene-diene-terpolymer.

11. A filler for unvulcanized rubber mixtures, wherein a surface of the filler is modified with a stimuli-sensitive substance, wherein the stimuli-sensitive substance is capable of attaining reversible rubber characteristics in rubber mixtures through at least one exterior parameter by interaction between the filler and at least one rubber and/or filler-filler interactions.

12. Process for making an unvulcanized rubber mixture comprising at least one rubber, aggregate, and at least one filler, wherein a surface of the at least one filler has been modified with a stimuli-sensitive substance, the process comprising:

coating a surface of at least one filler with a stimuli-sensitive substance to form at least one coated filler; and mixing the at least one coated filler with at least one rubber and aggregate to form the unvulcanized rubber mixture; and wherein the stimuli-sensitive substance attains reversible rubber characteristics through at least one exterior parameter by interaction between the at least one filler and the at least one rubber and/or filler-filler interactions of the at least one filler.

13. Rubber product formed from an unvulcanized rubber mixture, comprising:

at least one rubber;

aggregate; and at least one filler, wherein a surface of the at least one filler has been modified with a stimuli-sensitive substance; and wherein the stimuli-sensitive substance attains reversible rubber characteristics through at least one exterior parameter by interaction between the at least one filler and the at least one rubber and/or filler-filler interactions of the at least one filler.

14. Vulcanized rubber, comprising:

a rubber matrix comprising aggregate and at least one rubber; and at least one filler, wherein a surface of the at least one filler has been modified so as to form a stimuli-sensitive rubber mixture with the rubber matrix surrounding the at least one filler; and wherein the stimuli-sensitive rubber mixture attains reversible rubber characteristics through at least one exterior parameter by interaction between the at least one filler and the at least one rubber and/or filler-filler interactions of the at least one filler.

15. The vulcanized rubber of claim 14, wherein the at least one rubber comprises at least a first rubber and a second rubber, wherein the surface of the at least one filler is modified such that a stimuli-sensitive rubber mixture forms between the first rubber which is located on the filler surface and the second rubber.

16. The vulcanized rubber of claim 14, wherein the at least one rubber is selected from the group consisting of natural rubber, styrene-butadiene-copolymer, acrylonitrile-butadiene-copolymer, isoprene-butadiene-copolymer, polybutadiene, synthetic polyisoprene, isoprene-isobutylene-copolymer, and ethylene-propylene-diene-terpolymer.

17. The vulcanized rubber of claim 16, wherein the at least one rubber comprises at least polyisoprene and polybutadiene.

18. The vulcanized rubber of claim 14, wherein the at least one filler comprises active filler.

19. The vulcanized rubber of claim 18, wherein the at least one filler comprises at least one member selected from the group consisting of carbon black, silicic acid, carbon black modified by silicic acid, and polymer microgel.

20. The vulcanized rubber of claim 14, wherein the at least one filler comprises inactive filler.

21. Process for making vulcanized rubber comprising a rubber matrix comprising aggregate and at least one rubber, and at least one filler, wherein a surface of the at least one filler has been modified so as to form a stimuli-sensitive rubber mixture with the rubber matrix surrounding the at least one filler, the process comprising:

coating a surface of at least one filler with unvulcanized rubber to form at least one coated filler;

mixing the at least one coated filler with unvulcanized rubber and aggregate to form an unvulcanized rubber mixture; and vulcanizing the unvulcanized rubber mixture to form vulcanized rubber; and wherein the vulcanized rubber attains reversible rubber characteristics through at least one exterior parameter by interaction between the at least one filler and the at least one rubber and/or filler-filler interactions of the at least one filler.

22. The unvulcanized rubber mixture of claim 1, wherein 5 to 100 wt % of a total amount of the at least one filler has a surface exhibiting stimuli-sensitive characteristics.

23. The unvulcanized rubber mixture of claim 1, wherein 20 to 100 wt % of a total amount of the at least one filler has a surface exhibiting stimuli-sensitive characteristics.

24. The filler of claim 11, wherein 5 to 100 wt % of a total amount of the at least one filler has a surface exhibiting stimuli-sensitive characteristics.

25. The filler of claim 11, wherein 20 to 100 wt % of a total amount of the at least one filler has a surface exhibiting stimuli-sensitive characteristics.

26. The process of claim 12, wherein 5 to 100 wt % of a total amount of the at least one filler has a surface exhibiting stimuli-sensitive characteristics.

27. The process of claim 12, wherein 20 to 100 wt % of a total amount of the at least one filler has a surface exhibiting stimuli-sensitive characteristics.

28. The rubber product of claim 13, wherein 5 to 100 wt % of a total amount of the at least one filler has a surface exhibiting stimuli-sensitive characteristics.

29. The rubber product of claim 13, wherein 20 to 100 wt % of a total amount of the at least one filler has a surface exhibiting stimuli-sensitive characteristics.

30. The vulcanized rubber of claim 14, wherein 5 to 100 wt % of a total amount of the at least one filler has a surface exhibiting stimuli-sensitive characteristics.

31. The vulcanized rubber of claim 14, wherein 20 to 100 wt % of a total amount of the at least one filler has a surface exhibiting stimuli-sensitive characteristics.

32. The process of claim 21, wherein 5 to 100 wt % of a total amount of the at least one filler has a surface exhibiting stimuli-sensitive characteristics.

33. The process of claim 21, wherein 20 to 100 wt % of a total amount of the at least one filler has a surface exhibiting stimuli-sensitive characteristics.

34. The unvulcanized rubber mixture of claim 1, wherein the at least one exterior parameter comprises temperature.

35. The filler of claim 11, wherein the at least one exterior parameter comprises temperature.

36. The process of claim 12, wherein the at least one exterior parameter comprises temperature.

37. The rubber product of claim 13, wherein the at least one exterior parameter comprises temperature.

38. The vulcanized rubber of claim 14, wherein the at least one exterior parameter comprises temperature.

39. The process of claim 21, wherein the at least one exterior parameter comprises temperature.

40. A filler for unvulcanized rubber mixtures, consisting essentially of a filler having a surface modified with a stimuli-sensitive substance.

41. An unvulcanized rubber mixture comprising at least one rubber, aggregate, and at least one filler, wherein a surface of the at least one filler has been modified with a stimuli-sensitive substance, wherein the unvulcanized rubber mixture is made by a process comprising:
coating a surface of at least one filler with a stimuli-sensitive substance to form at least one coated filler; and
mixing the at least one coated filler with at least one rubber and aggregate to form the unvulcanized rubber mixture; and
wherein the stimuli-sensitive substance attains reversible rubber characteristics through an exterior parameter by interaction between the at least one filler and the at least one rubber and/or filler-filler interactions of the at least one filler.

42. The unvulcanized rubber of claim 41, wherein 5 to 100 wt % of a total amount of the at least one filler has a surface exhibiting stimuli-sensitive characteristics.

43. The unvulcanized rubber of claim 41, wherein 20 to 100 wt % of a total amount of the at least one filler has a surface exhibiting stimuli-sensitive characteristics.

44. The unvulcanized rubber of claim 41, wherein the at least one exterior parameter comprises temperature.

45. A vulcanized rubber comprising a rubber matrix comprising aggregate and at least one rubber, and at least one filler, wherein a surface of the at least one filler has been modified so as to form a stimuli-sensitive rubber mixture with the rubber matrix surrounding the at least one filler, wherein the vulcanized rubber mixture is made by a process comprising:
coating a surface of at least one filler with unvulcanized rubber to form at least one coated filler;
mixing the at least one coated filler with unvulcanized rubber and aggregate to form an unvulcanized rubber mixture; and
vulcanizing the unvulcanized rubber mixture to form the vulcanized rubber.

46. The vulcanized rubber of claim 45, wherein 5 to 100 wt % of a total amount of the at least one filler has a surface exhibiting stimuli-sensitive characteristics.

47. The vulcanized rubber of claim 45, wherein 20 to 100 wt % of a total amount of the at least one filler has a surface exhibiting stimuli-sensitive characteristics.

48. The vulcanized rubber of claim 45, wherein the stimuli-sensitive rubber mixture is sensitive with respect to temperature.

49. The unvulcanized rubber mixture of claim 1, wherein the at least one rubber comprises polybutadiene and polyisoprene, and wherein the interaction between the at least one filler and the at least one rubber and/or filler-filler interactions of the at least one filler comprises demixing at a border surface between the polybutadiene and polyisoprene.

50. The filler of claim 11, wherein the stimuli-sensitive substance is capable of causing demixing at a border surface between polybutadiene and polyisoprene in a rubber mixture.

51. The process of claim 12, wherein the at least one rubber comprises polybutadiene and polyisoprene, and wherein the interaction between the at least one filler and the at least one rubber and/or filler-filler interactions of the at least one filler comprises demixing at a border surface between the polybutadiene and polyisoprene.

52. The rubber product of claim 13, wherein the at least one rubber comprises polybutadiene and polyisoprene, and wherein the interaction between the at least one filler and the at least one rubber and/or filler-filler interactions of the at least one filler comprises demixing at a border surface between the polybutadiene and polyisoprene.

53. The vulcanized rubber of claim 14, wherein the at least one rubber comprises polybutadiene and polyisoprene, and wherein the interaction between the at least one filler and the at least one rubber and/or filler-filler interactions of the at least one filler comprises demixing at a border surface between the polybutadiene and polyisoprene.

54. The process of claim 21, wherein the at least one rubber comprises polybutadiene and polyisoprene, and wherein the interaction between the at least one filler and the at least one rubber and/or filler-filler interactions of the at least one filler comprises demixing at a border surface between the polybutadiene and polyisoprene.

55. The unvulcanized rubber mixture of claim 41, wherein the at least one rubber comprises polybutadiene and polyisoprene, and wherein the interaction between the at least one filler and the at least one rubber and/or filler-filler interactions of the at least one filler comprises demixing at a border surface between the polybutadiene and polyisoprene.

56. The unvulcanized rubber of claim 45, wherein the at least one rubber comprises polybutadiene and polyisoprene, and wherein the interaction between the at least one filler and the at least one rubber and/or filler-filler interactions of the at least one filler comprises demixing at a border surface between the polybutadiene and polyisoprene.

57. The unvulcanized rubber mixture of claim 1, wherein the interaction between the at least one filler and the at least one rubber and/or filler-filler interactions of the at least one filler changes the glass transition temperature of the unvulcanized rubber mixture.

58. The filler of claim 11, wherein the stimuli-sensitive substance is capable of changing the glass transition temperature of rubber mixtures.

59. The process of claim 12, wherein the interaction between the at least one filler and the at least one rubber and/or filler-filler interactions of the at least one filler changes the glass transition temperature of the unvulcanized rubber mixture.

60. The rubber product of claim 13, wherein the interaction between the at least one filler and the at least one rubber and/or filler-filler interactions of the at least one filler changes the glass transition temperature of the rubber product.

61. The vulcanized rubber of claim 14, wherein the interaction between the at least one filler and the at least one rubber and/or filler-filler interactions of the at least one filler changes the glass transition temperature of the vulcanized rubber.

62. The process of claim 21, wherein the interaction between the at least one filler and the at least one rubber and/or filler-filler interactions of the at least one filler changes the glass transition temperature of the vulcanized rubber.

63. The unvulcanized rubber mixture of claim 41, wherein the interaction between the at least one filler and the at least one rubber and/or filler-filler interactions of the at least one filler changes the glass transition temperature of the unvulcanized rubber mixture.

64. The unvulcanized rubber of claim 45, wherein the interaction between the at least one filler and the at least one rubber and/or filler-filler interactions of the at least one filler changes the glass transition temperature of the unvulcanized rubber.

* * * * *